United States Patent [19]
Burton

[11] Patent Number: 6,084,380
[45] Date of Patent: Jul. 4, 2000

[54] CONFORMING INTELLIGENT BATTERY LABEL

[75] Inventor: David Lynn Burton, McMinnville, Oreg.

[73] Assignee: Hewlett-Packard Company, Palo Alto, Calif.

[21] Appl. No.: 09/184,485

[22] Filed: Nov. 2, 1998

[51] Int. Cl.[7] .............................. H02J 7/00; H01M 10/48
[52] U.S. Cl. ..................... 320/107; 320/112; 320/132; 429/90
[58] Field of Search .................................. 320/107, 112, 320/132; 429/90

[56] References Cited

U.S. PATENT DOCUMENTS

| | | | |
|---|---|---|---|
| 4,948,683 | 8/1990 | Picozzi et al. | 429/90 |
| 4,968,567 | 11/1990 | Schisselbauer | 429/90 |
| 5,245,269 | 9/1993 | Tooley et al. | 320/114 |
| 5,411,817 | 5/1995 | Ridgway et al. | 429/90 |
| 5,478,665 | 12/1995 | Burroughs et al. | 429/90 |
| 5,483,165 | 1/1996 | Cameron et al. | 324/427 |
| 5,543,246 | 8/1996 | Treger | 429/90 |
| 5,573,870 | 11/1996 | Andrews | 429/96 |
| 5,600,231 | 2/1997 | Parker | 320/48 |
| 5,604,049 | 2/1997 | Weiss et al. | 429/93 |
| 5,614,333 | 3/1997 | Hughen et al. | 429/93 |
| 5,625,291 | 4/1997 | Brink et al. | 324/427 |
| 5,626,978 | 5/1997 | Weiss et al. | 429/43 |
| 5,644,207 | 7/1997 | Lew et al. | 320/101 |
| 5,709,962 | 1/1998 | Bailey | 429/93 |
| 5,721,482 | 2/1998 | Benvegar et al. | 320/43 |

*Primary Examiner*—Adolf Deneke Berhane
*Assistant Examiner*—Gregory J. Toatley, Jr.

[57] ABSTRACT

A thin, substantially planar intelligent battery label for attachment to an exterior surface of a standard battery pack to form an intelligent battery pack having dimensions substantially the same as the standard battery pack. The battery management system is implemented within the battery label as a circuit having a variety of components interconnected by a flex circuit. The components of the battery management system may be located on any desired surface of the standard battery pack so as to minimally interfere with the interoperation of the resulting intelligent battery pack with battery pockets designed to receive the standard battery pack. The battery label may be configured to attach to a wide variety of battery packs through the formation of appropriately placed hinge lines and battery management system components. The battery label is a layered device with battery management circuitry disposed on one surface of a flexible base substrate and covered by an impenetrable outer layer. Positive and negative power tabs are electrically connected the conductive traces and extend away from an edge of the battery label to be electrically connected to positive and negative terminals, respectively, of the standard battery pack. Various circuit components are included, such as status indicators, membrane buttons, and integrated circuits for providing a desired functionality include battery management functions. Bare metal contacts may also be included for communicating, sensing, etc.

20 Claims, 4 Drawing Sheets

CONFORMING INTELLIGENT BATTERY LABEL

BACKGROUND OF THE INVENTION

1. Field of the Invention

The present invention relates generally to battery packs and, more particularly, to intelligent battery pack labels for use with battery packs.

2. Related Art

Sudden cardiac arrest, i.e., a heart attack, has been attributed to over 350,000 deaths each year in the United States, making it one of the country's leading medical emergencies. World-wide, sudden cardiac arrest has been attributed to a much larger number of deaths each year. One of the most common and life threatening consequences of a heart attack is the development a cardiac arrhythmia commonly referred to as ventricular fibrillation. When in ventricular fibrillation the heart muscle is unable to pump a sufficient volume of blood to the body and, more importantly, to the brain. Ventricular fibrillation is generally identifiable by the victim's immediate loss of pulse, loss of consciousness and a cessation of breathing. The lack of blood and oxygen to the brain may result in brain damage, paralysis or death to the victim.

The probability of surviving a heart attack or other serious heart arrhythmia depends on the speed with which effective medical treatment is provided. There are four critical components of effective medical treatment that must be administered to a victim of sudden cardiac arrest: (1) early cardiopulmonary resuscitation to keep the blood oxygenated and flowing to the victim's brain and other vital organs; (2) early access to emergency care; (3) early cardiac defibrillation to restore the heart's regular rhythm; and (4) early access to advanced medical care. If prompt cardiopulmonary resuscitation is followed by defibrillation within approximately four minutes of the onset of symptoms, the victim's chances of surviving sudden cardiac arrest can approach or exceed forty percent. Prompt administration of defibrillation within the first critical minutes is considered one of the most important components of emergency medical treatment for preventing death from sudden cardiac arrest.

Cardiac defibrillation is an electric shock that is used to arrest the chaotic cardiac contractions that occur during ventricular fibrillation and to restore a normal cardiac rhythm. To administer this electrical shock to the heart, defibrillator pads are placed on the victim's chest, and an electrical impulse of the proper size and shape is administered to the victim in the form of an electric shock. While defibrillators have been known for years, they have typically been large and expensive making them unsuitable for use outside of a hospital or medical facility.

More recently however, portable external defibrillators for use by first responders have been developed. A portable defibrillator allows proper medical care to be given to a victim earlier than preceding defibrillators, increasing the likelihood of survival. Such portable defibrillators may be brought to or stored in an accessible location at a business, home, aircraft or the like, ready for use by first responders. With recent advances in technology, even a minimally trained individual can operate conventional portable defibrillators to aid a heart attack victim in the critical first few minutes subsequent to onset of sudden cardiac arrest.

Portable defibrillators require an energy source other than an alternating current source to operate in the anticipated environment. Although many manufacturers have provided customized battery packs for their portable defibrillators, some are designed to use a standard, commonly available, rechargeable battery pack, such as those used in video camcorders. These defibrillators incorporate standard mechanical and electrical adapters to mechanically and electrically connect the standard battery packs to the defibrillator. The use of standard battery packs allows for a simple and less expensive battery. Such battery packs may be, for example, a sealed lead acid (SLA) battery, a nickel cadmium (NiCd) battery, a lithium battery or the like.

Those manufacturers that have chosen to use the standard, commonly available rechargeable battery packs have designed their portable defibrillators to receive such a battery pack in a battery pocket. That is, the battery pocket is designed to physically accommodate, mechanically connect and electrically interface to the desired standard battery pack. The battery packs are manufactured with a certain tolerance in their minimum and maximum physical dimensions, the placement and dimensions of recesses and electrical contacts, and other electrical or mechanical features. Since these dimensions vary somewhat among battery pack manufacturers and are not held to strict tolerances by an individual manufacturer, the battery pockets are generally configured with dimensions sufficient to receive slight variations of the desired standard battery pack.

More recently, additional functionality has been incorporated into battery packs to create what is commonly referred to as smart or intelligent battery packs. The primary purpose of intelligent battery packs has been to provide power management circuitry in addition to one or more battery cells, all of which is integrated within the battery pack case. Such power management functions may include, for example, determining the present charge state of the battery pack, generating status information and the like. The advent of intelligent battery packs has resulted in the functional division of battery packs and has given rise to the vernacular "smart" and "non-smart" battery packs to denote those that do and do not, respectively, include power management or other processing capabilities.

However, because conventional intelligent battery packs usually have an external shell containing the smart circuitry, they have dimensions greater than standard, non-smart battery packs. As a result, smart battery packs often will not fit within the battery pocket of a portable defibrillator designed to operate with an equivalent standard battery pack. This has left manufacturers of conventional defibrillators with few options when incorporating power management functions into the device. One approach has been to redesign the battery pocket to accommodate the smart battery pack. However, redesigning defibrillator to encompass the larger intelligent battery pack is extremely costly and renders the defibrillator incapable of operating with the standard, non-smart battery packs. As a result, such modified defibrillators become more costly to operate since such smart battery packs are not readily available and are generally more expensive.

Alternatively, manufacturers may implement the desired power management functionality in the defibrillator itself. This approach has drawbacks as well. Implementing power management functions in the portable defibrillator often requires other portions of the defibrillator to be redesigned to accommodate the associated hardware, and often increases circuit density. In addition to the cost of such redesign efforts, this may also produce potentially undesirable results, such as increasing electrical noise or overheating. Also, some functions such as a fuel gauge of a smart battery cannot be implemented except by circuitry that remains permanently attached to the battery.

What is needed, therefore, is a smart battery pack that can operate in a battery pocket designed to accommodate a standard, non-smart battery pack.

SUMMARY OF THE INVENTION

The present invention includes a battery management system implemented as a flexible, substantially planar battery label adapted to be securely wrapped around a portion of an exterior surface of a standard battery pack. The battery label conforms to the battery pack exterior surface to form an intelligent battery pack having dimensions substantially the same as the original standard battery pack. Significantly, this enables the intelligent battery pack to operate within a battery pocket configured to interoperate with the standard battery pack. Also, the present invention provides for a non-intelligent battery pack to be converted to a self-contained intelligent battery pack capable of performing battery management functions having a physical size substantially the same as the standard battery pack. As a result, the present invention also provides for the manufacture of an intelligent battery pack using relatively low cost standard battery packs.

Advantageously, the present invention eliminates the need to redesign a battery pocket to accommodate a different dimensioned battery pack in order to utilize battery packs having functionality beyond that of the standard battery pack for which the battery pocket was originally designed. It also eliminates the need to redesign the physical configuration of the battery-powered device to implement battery management functions. A number of aspects of the invention are summarized below, along with different embodiments that may be implemented for each of the summarized aspects. It should be understood that the embodiments are not necessarily inclusive or exclusive of each other and may be combined in any manner that is non-conflicting and otherwise possible. It should also be understood that these aspects of the invention are exemplary only and are considered to be non-limiting.

In one aspect of the invention, a battery management system is disclosed. The battery management system is implemented as a flexible, substantially planar battery label adapted to be securely wrapped around a portion of an exterior surface of a standard battery pack. The battery label is constructed and arranged to conform to the battery pack exterior surface to form an intelligent battery pack having dimensions substantially the same as the standard battery pack. The battery management circuit includes a plurality of circuit components and a flex circuit having a plurality of conductive traces for electrically interconnecting such components. The battery management circuitry is disposed on one surface of a flexible base substrate having an opposing surface adapted to be securely attached to an exterior portion of the standard battery pack. Positive and negative power tabs are electrically connected to the conductive traces and extend away from an edge of the battery label to be electrically connected to positive and negative terminals, respectively, of the standard battery pack.

In one embodiment, the battery label further includes a flexible base substrate having a first surface configured to securely receive the battery management system and an opposing second surface adapted to be securely attached to the portion of said exterior of said standard battery pack. A flexible, water-impenetrable outer substrate layer attached to said first surface of said base substrate to encase said battery management system. The battery label has a number of hinge lines appropriately positioned to align with edges of said battery pack, enabling the battery label to be conformed to the exterior surface of the standard battery pack. An adhesive layer may be provided to securely attach the flexible base substrate to the exterior surface of the battery pack. No battery management circuitry components may be located at the hinge lines.

In another embodiment, the battery management system is implemented in a circuit. The circuit includes a plurality of circuit components and a flex circuit having a plurality of conductive traces formed within said flexible substrate for electrically interconnecting said plurality of circuit components. Preferably, the plurality of circuit components includes positive and negative power tabs each electrically connected to one of a conductive trace. The power tabs extend away from an edge of the battery label to be electrically connected to positive and negative terminals of the battery pack, thereby providing continuous power to the battery management system. The components may include resistors, capacitors, transistors, integrated circuits, status indicators such as light emitting diodes, liquid crystal display, thermochromic display, and electrochromic display.

In another aspect of the present invention, a thin battery label is disclosed. The thin battery label includes a battery management circuit that includes a plurality of circuit components interconnected by a flex circuit. A flexible base substrate having a first surface configured to securely receive the battery management circuit, and an opposing second surface adapted to be attached to the exterior portion of a standard battery pack. The components may include resistors, capacitors, transistors, integrated circuits, status indicating devices, and the like. The status indicating devices may include light emitting diodes, liquid crystal displays, and electrochromic and thermochromic displays.

In one embodiment, an adhesive layer applied to the second surface of the flexible base substrate is provided. The adhesive layer securely attaches the second surface to the exterior portion of the standard battery pack. The battery management circuit monitors the standard battery pack and generates one or more status indications based on such monitoring. An outer layer, preferably composed at least partially of a polyester film or PTFE, is applied to the first surface for covering and protecting the battery management circuit.

In a still further aspect of the invention, a method for manufacturing an intelligent battery pack is disclosed. The method includes the steps of: (1) providing a flexible base substrate having a substantially planar first surface and an opposing, substantially planar second surface; (2) disposing a battery management circuit on said first surface of said flexible base substrate; (3) providing a standard battery pack; and (4) securing said second surface of said flexible base substrate to an exterior surface of said standard battery pack to form an intelligent battery pack having dimensions substantially the same as said standard battery pack. Preferably, a step of securing a flexible outer layer to said first surface of said flexible base substrate to encompass said battery management circuit between said other layer and said base substrate is also included.

Various embodiments of the present invention provide certain advantages and overcome certain drawbacks of the conventional battery label and battery back techniques. Not all embodiments of the invention share the same advantages and those that do may not share them under all circumstances. This being said, embodiments of the present invention provide numerous advantages including the noted advantage of the manufacture of an intelligent battery pack using an existing battery pack while eliminating the need to redesign the battery pocket designed to use such an existing battery pack. Specifically, embodiments of the present invention allow for a non-intelligent battery pack to be converted to a self-contained intelligent battery pack capable of providing battery management data to a user or to the battery-powered device without substantially increasing the physical size or mass of the battery pack.

BRIEF DESCRIPTION OF THE DRAWINGS

This invention is pointed out with particularity in the appended claims. The above and further advantages of this invention may be better understood by referring to the following description when taken in conjunction with the accompanying drawings, in which:

DETAILED DESCRIPTION

The present invention is a thin, substantially planar intelligent battery label for attachment to an exterior surface of a standard battery pack to form an intelligent battery pack having dimensions substantially the same as the standard battery pack. A battery management system is implemented within the battery label as a circuit having a variety of circuit components interconnected by flexible, conductive traces. Significantly, this enables the components of the battery management system to be located on any desired surface of the standard battery pack so as to interfere minimally with the interoperation of the resulting intelligent battery pack and the battery pockets designed to receive the standard battery pack. In addition, the battery label may be configured to attach to a wide variety of standard battery packs through the formation of appropriately placed hinge lines and battery management system components. Thus, another aspect of the present invention is an intelligent battery pack including a standard battery pack and a smart battery label secured thereto so as to conform to the standard battery pack while providing advanced intelligent battery management or other desired functions. The structure and operation of the present invention will be described in detail below with references to FIGS. 1–3.

Figure 1:
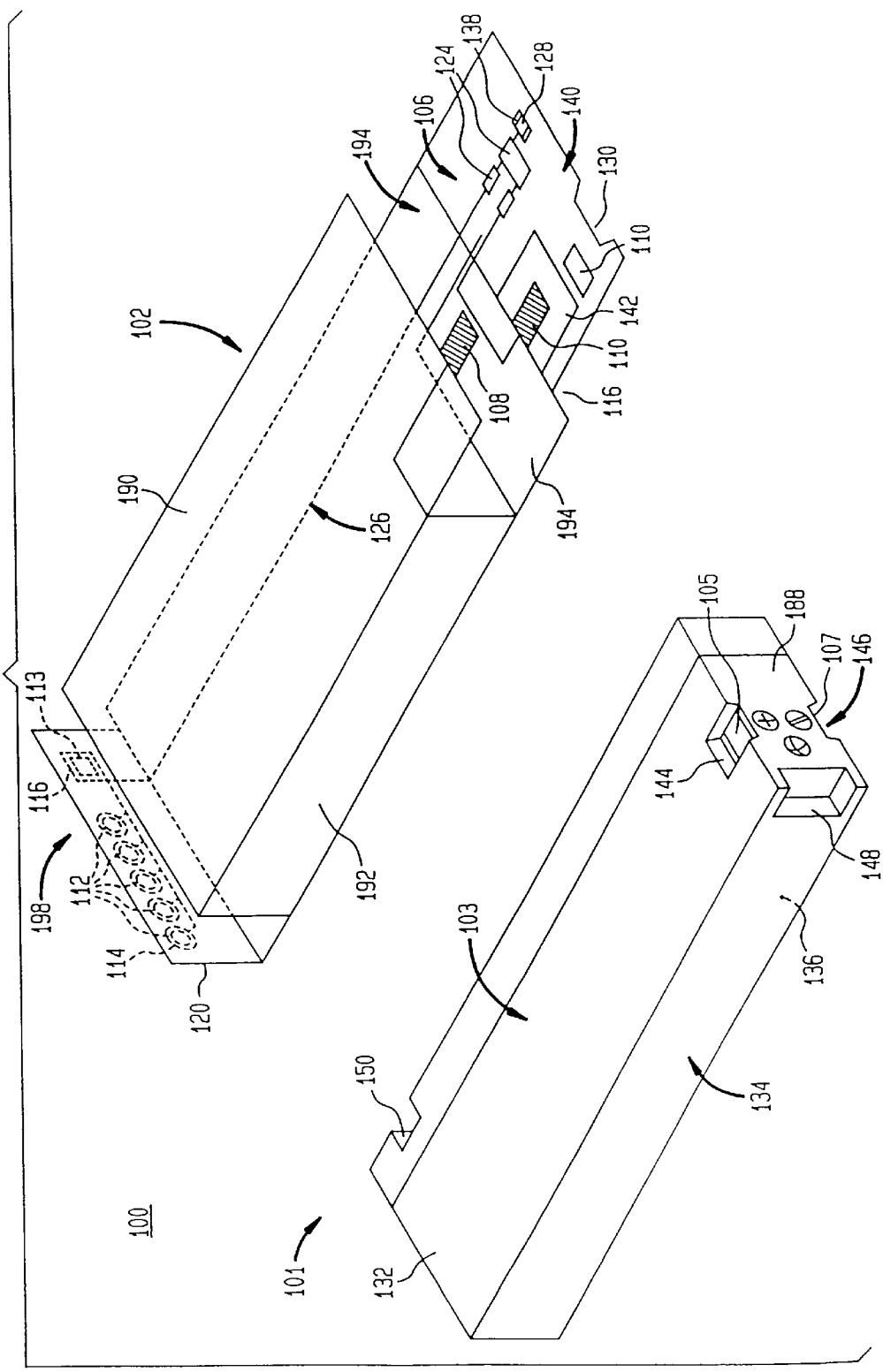
FIG. 1 is a perspective view of a smart battery label used in embodiments of the present invention.
Figure 2:
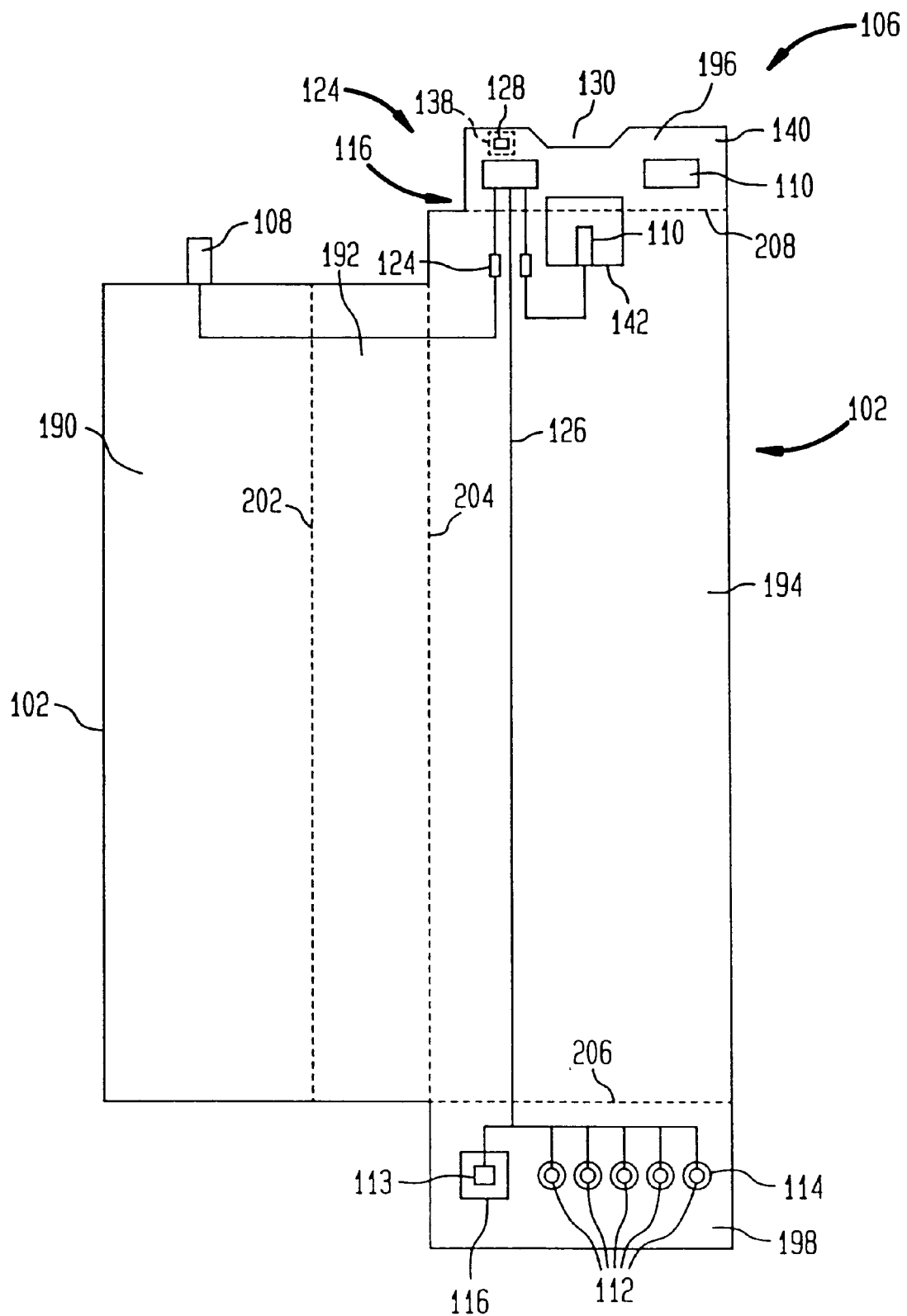
FIG. 2 is a perspective view of the flexible sheet used in embodiments of the present invention in an unfolded condition.
Figure 3:
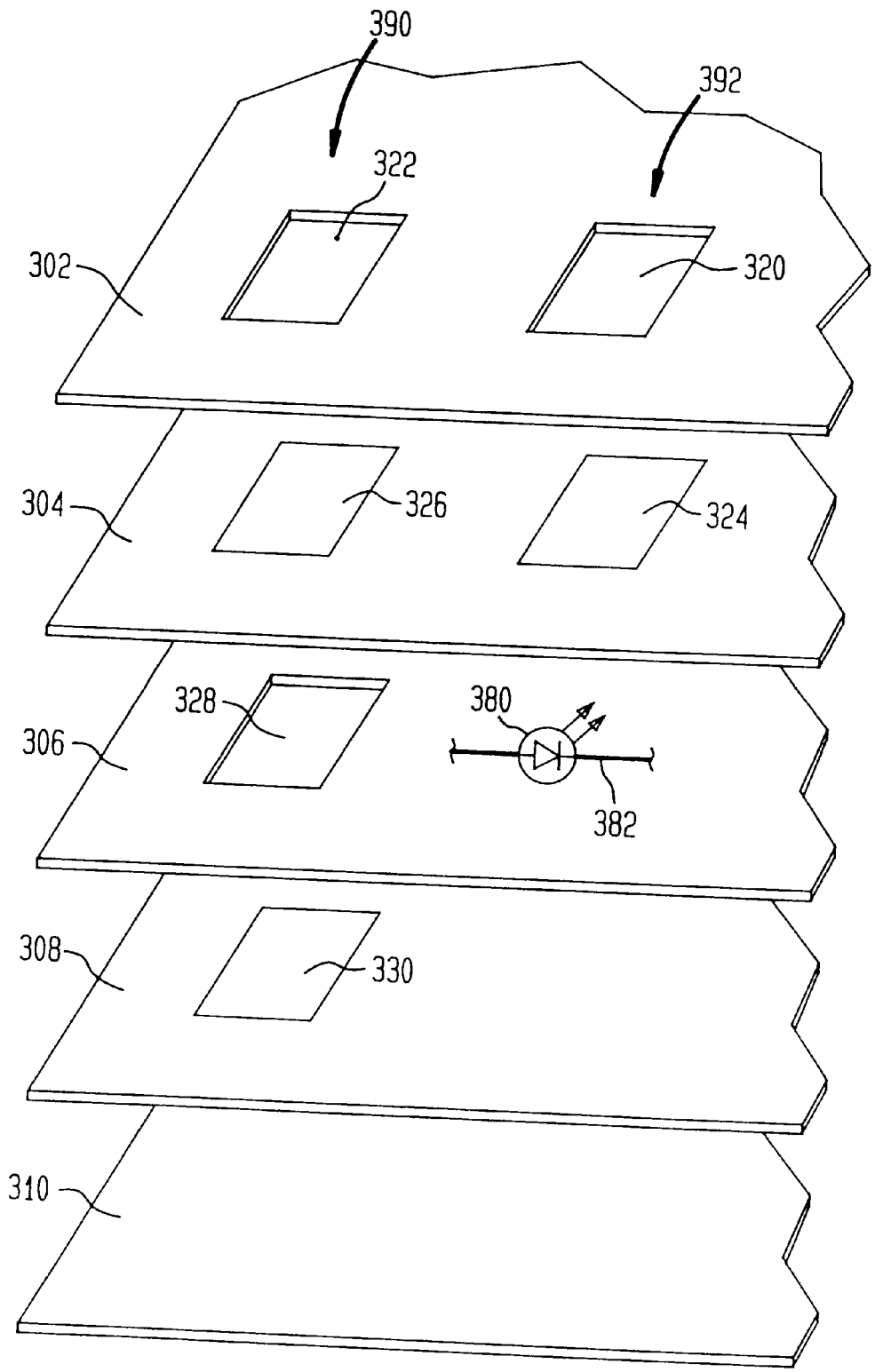
FIG. 3 is a perspective view showing the various laminated layers used in embodiments of the present invention.

FIG. 1 is an exploded perspective view of an intelligent battery pack 100 showing a standard battery pack 101 and one embodiment of a smart battery label 102 of the present invention configured to conform to the exterior portion of standard battery pack 101. Prior to application to battery pack 101, battery label 102 is a thin, flexible, substantially planar battery label. As will be explained in detail below, battery label 102 is preferably formed from circuitry interposed between and encased by two flexible substrate layers. FIG. 2 is a perspective view of battery label 102 in an unfolded condition with certain layers removed to illustrate battery management circuitry 106. FIG. 3 is a partial perspective view of battery label 102 illustrating the various layers that may be included in one embodiment of battery label 102.

As noted, the present invention may be implemented with many standard battery packs now or later developed. As used herein, the term "standard" battery pack refers to battery packs which do not contain additional functionality beyond that provided by battery cells. Such battery packs may be customized battery packs as well as industry standard battery packs. The illustrated standard battery pack 101 is a Panasonic model LC-TA122P battery pack which is commonly used in video camcorders. Such a battery pack is also commonly used in many battery-powered devices, including medical devices such as portable defibrillators. Although the present invention will be described below in terms of this particular battery pack, it should be understood that the teachings of the present invention apply to any smart or non-smart battery pack now or later developed. It is considered to be within the purview of one of ordinary skill in the art to apply the teachings of the present application to other battery packs to add the processing capabilities of an intelligent battery label in accordance with the present invention.

Smart battery label 102 is a thin, substantially planar sheet configured to conform to some portion of an exterior surface 103 of battery pack 101. Referring to FIG. 1, the portion of exterior surface 103 which is to be covered generally includes multiple sides of battery pack 101. In the illustrative embodiment, battery label 102 is constructed and arranged to conform and securely attach to three sides 132, 134, 136 of battery pack 101. As shown best in FIG. 2, creases or hinge lines 202, 204, 206 and 208 are formed in battery label 102 to ensure that sharp and precise bends may be created with battery label 102 to conform to surfaces 132–136 of battery pack 101. The dimensions of the battery label areas subtended by hinge lines 202–208 correspond to the dimensions of the corresponding exterior surfaces 132–136 of battery pack 101 on which battery label 102 is secured. In the illustrative embodiment, top flap 190 is defined by the location of hinge line 202 while side flap 192 is delineated by hinge lines 202 and 204. Bottom flap 194 is defined by hinge lines 204, 206 and 208. Front flat 196 is defined by hinge line 208 while rear flap 198 is defined by hinge line 206.

Smart battery label 102 includes a circuit generally depicted by reference numeral 106. Preferably, circuit 106 includes flex circuitry 126 for electrically connecting various components 124 of circuit 106 to each other. Flex circuitry 126 includes conductive traces which, for example, may be conductive inks, that connect components 124 that are mounted on pads (not shown) formed in flex circuitry 126 using well-known surface mounting techniques such as low temperature solder or conductive adhesives.

Electric components 124 may include resistors, capacitors, transistors, integrated circuits, various display devices and other circuit components. Importantly, the size and location of circuit components 124 are such that intelligent battery pack 100 has substantially the same dimensions as battery pack 101. Since circuit components 124 protrude outward from surface 140 of battery pack 101, certain components are to be mounted on a flap of battery label 102 that is to be secured to a surface of battery pack 101 that has sufficient physical clearance in a battery pocket designed for battery pack 101. This will prevent components 124 from being damaged and from mechanically impeding movement of battery pack 101 in and out of the battery pocket. Alternatively, components having a larger profile may be positioned on a flap that is not restricted by dimensions of battery pocket. For example, in the illustrative embodiment, the battery pocket does not have a surface that covers rear flap 198. In such an embodiment, larger circuit components may be located on such a flap.

In addition, the location of circuit components are not to be located over hinge lines 202–208 as such positioning would prevent battery label 102 from taking on the desired shape. The conductive traces of flex circuitry 126, however, may crossover or run within hinge lines 202–208.

As noted, components 124 may include virtually any type of circuit component required to perform the functions of circuit 106. Electric components 124 include positive and negative power tabs 108, 110. Power tabs 108, 110 extend from respective edges of battery label 102 and are electrically connected to flex circuitry 126 to provide an electrical connection to battery terminals 105, 107. Additionally, circuit components 124 includes communication ports, status indicators 112 for displaying information, and a user-activated switches such as membrane switch 113.

In a preferred embodiment of the present invention, LEDs are used in order to provide the necessary status indication. One skilled in the art would recognize that many other status indicators may be used. For example, LCDs, thermochromic, and electrochromic displays may be used as the status indicators for the battery management system, or the user interface of the portable electronic device, if any, may also be used to provide the battery capacity information to the user as well.

In addition, smart battery label 102 includes various windows and apertures to prevent battery label 102 from interfering with the mechanical and electrical interfaces of battery pack 101 and to provide the necessary user interface appropriate for the implemented functionality of circuit 106. Apertures are formed within or at an edge of a flap of battery label 102 to provide a passageway through the battery label substrate 102 so as not to interfere with the various mechanical and electrical interface connections between battery pack 101 and the battery pocket. Windows are formed in battery label 102 to provide a clear optical pathway to enable a user to visualize an optical status indicator or to otherwise access components 124 of the implemented circuit 106. Windows may or may not involve the removal of an upper surface of battery label 102.

In the illustrative embodiment, battery pack 101 includes a recess 144 in which a positive terminal 105 resides and a bottom recess 146 in which negative terminal 107 resides. Aperture 130 is formed in an edge of battery label 102 to prevent battery label 102 from obscuring recess 144 or otherwise preventing access to positive terminal 105. This allows the battery-powered device to securely mate with the mechanic and electrical interface of intelligent battery pack 100.

Similarly, aperture 142 is formed through battery label 102 adjacent to recess 146 of battery pack 101. As noted recess 146 has disposed therein negative terminal 107. Extending within aperture 142 is negative contact 110. Negative contact 110 is electrically connected to negative terminal 107 when battery label 102 is installed on battery pack 101. Aperture 142 prevents battery label 102 from obscuring or otherwise interfering with access to recess 146 and negative terminal 107.

A recess 148 is formed in a side of battery pack 101 for mating with a protrusion in the battery pack. To enable the protrusion to slide freely into and out of recess 148, an aperture 116 is formed in battery label 102 as shown in FIG. 1. As shown, aperture 116 is formed on the edge of battery label 102 to prevent battery label 102 from extending over recess 148 on front face surface 188 of battery pack 101. As would be obvious to one of ordinary skill in the relevant art, the present invention is not limited to the configuration of any one particular battery pack. Accordingly, battery label apertures may be adapted to any battery pack configuration.

As noted, windows are also provided on battery label 102 to provide visual access to circuit components encased within battery label 102. In the illustrative embodiment, windows are provided in rear flap 198 since it is anticipated that intelligent battery pack 101 will be installed in a battery pocket that leaves exposed rear flap 198.

Status indicators 112 which are to be visualized by the user must be located on the rearward-facing surface 198 of battery label 102. This surface, which is positioned at the entrance of the battery pocket, allows the user to visualize the various status indicators when intelligent battery pack 100 is installed in a battery pocket. In addition, any user input switches must also be located on a surface that is physically accessible to the user. In the illustrated embodiment battery label 102 also includes an embossed window 116 that is aligned with a user input switch in order to provide a raised portion over the switch contact. This provides a superior feel for the user when using the switch.

Windows 114 may be formed on an outer layer of battery label 102. For example, an outer layer or portion of battery layer 102 may be formed of a transparent material at the regions in which window 114 are to be formed. Alternatively, windows 114 may be formed by removing a portion of an outer layer of battery label 102, completely exposing status indicators 112. It should be understood that windows 114 can be individually formed as shown. Alternatively, one or more windows 114 may be joined to form a larger window opening for more than one status indicators. Also, other types of status indicators are larger or configured to have specific shapes. Windows 114 may be configured to provide visual access to such status indicators accordingly.

Windows are also formed in battery label 102 to provide physical access to circuit components. For example, in the illustrative embodiment, conductive interface tabs 128 for supporting data communications are provided in battery management system 106. Accordingly, battery label 102 includes a window 138 on front side flap 196 exposing conducive tabs 128. This facilitates electrical connections between conductive interface tabs 128 and a corresponding mating electrical interface and adapter within the battery pocket. Such an interface allows data and other electrical signals for various monitoring and data processing functions to pass to and from smart battery label 102. Similarly, in alternative embodiments, communications ports are provided on rear flap 198 for communications to an external unit. Appropriate windows would be provided here as well.

In one embodiment, electric circuit 106 comprises a battery management system that monitors battery pack conditions and provides such information to the user visually or, in certain embodiments, to the battery-powered system through a data communications port.

In one embodiment of the present invention, electronic circuitry 106 includes a Gas Gauge IC, BQ2013HIC, manufactured by Benchmarq Corp. that provides for the accurate measurement of available charge in rechargeable batteries and is able to measure a wide dynamic current range and supports both NiCd and lead acid rechargeable batteries. In addition, the BQ2013H Gas Gauge IC also provides a direct drive of LEDs for a capacity display.

By using a sense resistor input, the voltage drop across a sensor resistor is monitored and integrated over time to interpret the charge and discharge activity of the battery pack. In this embodiment, a user input switch 113 may be provided to provide a user input for testing the capacity of battery pack 101. In this way, a user may determine quickly and accurately the capacity remaining within rechargeable battery pack 101 and determine whether or not intelligent battery pack 101 needs to be replaced before use of the portable electronic device.

FIG. 3 shows one embodiment of battery label 102 having multiple layers of substrates secured together with adhesives to encase circuitry 106. A flexible base substrate 306 is provided for receiving circuitry 106. Base substrate 306 may be any thin and, if necessary, flexible material that can conform to surface 103 of a battery pack such a battery pack 101. If battery label 102 is to be applied to more than one surface of battery pack 101, base substrate 306 will have formed therein hinge lines at which base substrate 306 will be folded, bent or otherwise adjusted from a substantially planar configuration. In one embodiment, base substrate 306 is a polyimide or polyester and has a thickness of approximately 0.01 inches. In another embodiment wherein the battery label 102 is to be applied to a single surface of battery pack 101, base substrate 306 may be a less flexible member made of, for example, fiberglass. An aperture 328 is formed within base substrate 306 to contribute to the formation of aperture 390 through battery label 102.

Circuitry 106 is disposed on base substrate 306. A portion of circuit 106 shown in FIG. 3 includes a segment of one conductive trace of flex circuit 382 and one status indicator 380. As noted, flex circuit 382 may be composed of conductive ink or copper which may be printed, etched, or otherwise deposited on the surface of the flexible base substrate 306. In addition, surface mount components such as resistors, capacitors, integrated circuits, and status indicating devices (not shown in FIG. 3), are then mounted on the surface of base substrate 306.

In the illustrated embodiment, an outer layer 302 is provided to protect circuit 106 disposed on base substrate 306, forming a laminated thin film circuit. Outer layer 302 will contain apertures 320 and 322 which subsequently form windows and apertures, respectively, in battery label 102. In the portion of battery label 102 illustrated in FIG. 3, aperture 320 contributes to the formation of window 392 while aperture 322 contributes to the formation of aperture 390.

Outer layer 302 may be any suitable flexible plastic, polyester or polycarbonate, or a chemically impregnated paper that is of sufficient thickness and chemical composition to provide the necessary mechanical, chemical and electrical isolation of circuitry 106 from its environment. Outer layer 302 should be substantially impervious to water and other liquids. In one preferred embodiment, outer layer 302 is at least partially comprised of Mylar®. In one embodiment, outer layer 302 has a thickness of approximately 0.01 inches.

Outer layer 302 is secured to the top surface of base substrate 306 with an adhesive 304. Adhesive 304 is any known adhesive material that is capable of withstanding expected environmental conditions and compatible with other label materials. In one embodiment, adhesive layer 304 is a pressure sensitive adhesive (PSA) such as a laminating adhesive available from 3M, St. Paul, Minn., and has a thickness of approximately 0.02 inches.

Adhesive layer 304 also may contain apertures to form battery label apertures and windows. As shown, two apertures 324 and 326 are shown. Aperture 324 contributes to the formation of window 392 in battery label 102 while aperture 326 contributes to the formation of aperture 390 in battery label 102.

A second adhesive layer 308 attaches base substrate 306 to exterior surface 103 of he battery pack 101. Adhesive 308 also must be capable of withstanding expected environmental conditions and compatible with other label materials. In one embodiment of the present invention, adhesive layer 308 is a PSA with a peel off layer 310 to protect the adhesive until the label 102 is installed on battery pack 101. In one embodiment, adhesive layer 308 is an adhesive similar to adhesive alyer 304, and has a thickness of approximately 0.02 inches. Aperture 330 is formed in adhesive layer 308 to form aperture 390 in battery label 102. It should be noted that additional apertures are not provided on layers 308 and 320 to form window 392 since window 392 provides a user access to circuit components 124, and does not, therefore, extend beyond base substrate 306.

It should be understood that all apertures of each layer 302–310 that form an aperture or window of battery label 102 are to be formed in their respective layers so as to be aligned with each other and the portion of the circuit 106 or battery pack 101 that they are associated with. It should also be understood that battery label 102 may be formed with many other known techniques. For example, in one alternative embodiment, battery label 102 is formed by encapsulating circuit 106 within a flexible membrane or by coating a thin printed circuit board made using known techniques. Windows and apertures may be etched or cut from the label 102 using any known technique.

Figure 4:
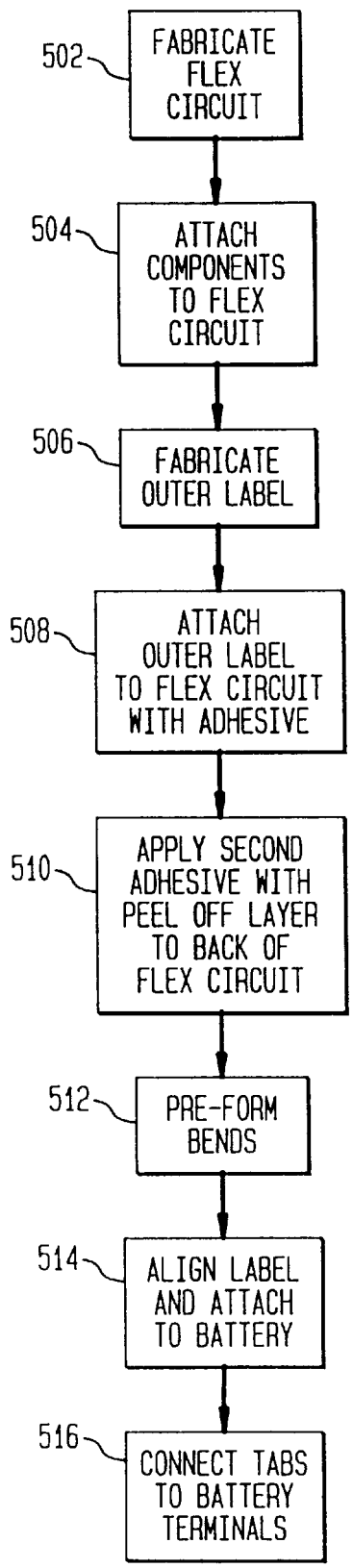
FIG. 4 is a flow chart describing a method of manufacturing an embodiment of the present invention.

FIG. 4 illustrates a method of manufacturing the smart battery label. In step 402 a flexible base substrate 102 is provided on which the flex circuit 126 is fabricated. The flexible base substrate 102 may punched or cut out of a larger planar sheet, or directly molded or otherwise formed. In one embodiment, base substrate 102 may be formed with a first side coated with an adhesive 304 that is covered by a peel off backing 306. Conductive traces of flex circuitry 126 are printed, or otherwise applied or deposited, on the surface of flexible base substrate 102 opposite the one that is coated by adhesive, if used. The conductive material is also used to form bonding pads for the components, and the conductive material is also used to form conductive interface contact pads 128. In addition, any apertures through base substrate 102 are formed. In step 404, the various electronic components are attached to their respective bonding pads providing a mechanical and an electrical interface to flex circuit 126. The attachment of the components to the flex circuit bonding pads may be made with low temperature solder, a conductive adhesive, or other methods known in the art for securing surface mount devices to their respective bonding pads.

In step 406, the outer label is now fabricated. This includes forming the various apertures corresponding to the various windows and apertures of battery label 102 aligned with the various mechanical and electrical interfaces on the exterior surface of battery pack 101 or circuit 106. At step 508, outer label 302 is attached to the base substrate 306. Base substrate 102 is applied with a layer of pressure sensitive adhesive.

In step 410, a second adhesive layer 308 with a peel-off backing 310 is attached to the back of the base substrate 102 such that the peel-off layer 310 protects the adhesive until use. In another embodiment, the adhesive and peel off layer have been previously attached. In step 412, crease or hinge lines 202, 204, 206 and 208 are created in battery label 102 to ensure sharp and precise bends in the flexible base substrate 102. The dimensions of the areas subtended by the crease or hinge lines correspond to the dimensions of the particular exterior surfaces of battery pack 101 over which battery label 102 is secured.

In step 414, battery label 102 is aligned, and peel layer is removed exposing adhesive layer 308, and latch 102 is attached to battery pack 101. In step 416, the battery power tabs 108, 110 extending from battery label 102 are mechanically and electrically attached to battery terminals 105, 107, respectively on battery pack 101. The tabs may be connected to the battery terminal using any methods that provides efficient mechanical strength and low series resistance in the electrical connection. For example, spot welding the tabs to the battery terminals would provide sufficient strength and electrical connectivity. Other methods may include soldering and the use of conductive adhesive.

It should be understood that various changes and modifications of the embodiments shown in the drawings and described in the specification may be made within the spirit and scope of the present invention. For example, the present invention may be used with smart-battery packs as well as non-smart battery packs. Such an application may occur when the battery label provides functions not included in the smart battery pack. That is, the present invention may be used to supplement currently intelligent battery packs. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A battery management system for attachment to a standard battery pack to form an intelligent battery pack, the battery management system comprising:

a flexible, substantially planar battery label constructed and arranged to be securely affixed to a portion of an exterior surface of the standard battery pack, wherein said battery label conforms to the battery pack exterior surface thereby forming an intelligent battery pack having dimensions substantially the same as the standard battery pack, whereby said intelligent battery pack can be installed in a battery pocket configured to interoperate with the standard battery pack.

2. The system of claim 1, wherein said battery management system is implemented in a circuit, said circuit comprising:

a plurality of circuit components mounted on said battery label; and a flex circuit having a plurality of conductive traces formed within said flexible substrate for electrically interconnecting said plurality of circuit components.

3. The system of claim 2, wherein said battery label further comprises:

a flexible base substrate having a first surface configured to securely receive said battery management system and an opposing second surface constructed and arranged to be securely attached to said portion of said exterior of said standard battery pack.

4. The system of claim 2, wherein said battery label further comprises:

a flexible, water-impenetrable outer substrate layer attached to said first surface of said base substrate to encase said battery management system.

5. The system of claim 2, wherein said plurality of circuit components comprises:

positive and negative power tabs each electrically connected to one of said plurality of conductive traces, said positive an negative tabs extending away from an edge of said battery label to be electrically connected to positive and negative terminals, respectively, of said standard battery pack, wherein said power tabs provide continuously power to said battery management system when said battery management system is affixed to said exterior of said standard battery pack.

6. The system of claim 5, wherein said components comprise:

at least one from the group of resistors, capacitors, and transistors, and integrated circuits.

7. The system of claim 5, wherein said components comprise:

at least one status indicator.

8. The system of claim 7, wherein said status indicators comprise:

at least one from the group of light emitting diode, liquid crystal display, thermochromic display, and electrochromic display.

9. The system of claim 5, wherein said components comprise:

bare metal contacts for input and output communications with an external instrument.

10. The system of claim 4, wherein said battery label formed therein has a number of hinge lines appropriately positioned to align with edges of said battery pack, enabling said battery label to be conformed to said exterior surface of said standard battery pack.

11. A thin battery label for use with a standard battery pack to be installed in a battery port comprising:

a flex circuit having one or more electronic components and a plurality of conductive traces for electrically interconnecting said one or more components and terminals of the standard battery pack, said flex circuit performing battery management operations; and a flexible base substrate having a first surface constructed and arranged to receive securely said flex circuit and an opposing second surface constructed and arranged to be attached to a portion of an exterior surface of the standard battery pack such that said battery label conforms to the standard battery pack exterior surface to which it is attached, wherein the one or more electronic components are arranged on said flexible base substrate such that electronic components having a relatively greater dimension are attached to a side of the standard battery pack for which there is no adjacent battery port surface.

12. The battery label of claim 11, further comprising:

an adhesive layer applied to said second surface of said flexible base substrate for securely attaching said second surface to said exterior portion of the standard battery pack.

13. The battery label of claim 11, wherein said battery management operations include monitoring said standard battery pack and generating one or more status indications based on said monitoring operation.

14. The battery label of claim 13, wherein said at least one indicator of the battery pack status includes an indicator representing a charge remaining in the standard battery pack.

15. The battery label of claim 11, further comprising:

an outer layer applied to said first surface for protecting said flex circuit.

16. The battery label of claim 15, wherein said outer layer is composed at least partially of a polyester film.

17. The battery label of claim 13, wherein said outer layer is composed at least primarily of polycarbonate.

18. A method for manufacturing an intelligent battery pack comprising the steps of:

providing a flexible base substrate having a substantially planar first surface and an opposing, substantially planar second surface;

disposing a battery management circuit on said first surface of said flexible base substrate;

providing a standard battery pack; and securing said second surface of said flexible base substrate to an exterior surface of said standard battery pack to form an intelligent battery pack having dimensions substantially the same as said standard battery pack.

19. The method of claim 18, further comprising the step of:

securing a flexible outer layer to said first surface of said flexible base substrate to encompass said battery management circuit between said other layer and said base substrate.

20. The method of claim 19, further comprising the step of:

applying, prior to said securing step, an adhesive to said first surface.

* * * * *